United States Patent
Ono et al.

(10) Patent No.: US 12,439,294 B2
(45) Date of Patent: Oct. 7, 2025

(54) CONTROL SYSTEM AND CONTROL METHOD

(71) Applicant: RAKUTEN MOBILE, INC., Tokyo (JP)

(72) Inventors: Makoto Ono, Tokyo (JP); Kazushige Takeuchi, Tokyo (JP); Masahiro Kojima, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/246,682

(22) PCT Filed: Nov. 30, 2021

(86) PCT No.: PCT/JP2021/043918
§ 371 (c)(1),
(2) Date: Mar. 27, 2023

(87) PCT Pub. No.: WO2023/100253
PCT Pub. Date: Jun. 8, 2023

(65) Prior Publication Data
US 2024/0306040 A1    Sep. 12, 2024

(51) Int. Cl.
*H04W 28/086* (2023.01)
*H04W 28/02* (2009.01)
*H04W 88/08* (2009.01)

(52) U.S. Cl.
CPC ... *H04W 28/0864* (2023.05); *H04W 28/0221* (2013.01); *H04W 88/08* (2013.01)

(58) Field of Classification Search
CPC ......... H04W 28/0864; H04W 28/0221; H04W 88/08; H04W 52/02; Y02D 30/70
See application file for complete search history.

(56) References Cited

U.S. PATENT DOCUMENTS 6,387,536 B1 * 5/2002 Takagi ............... C23C 14/165
428/650
2013/0102301 A1 * 4/2013 Shinada .............. H04W 28/12
455/418

(Continued)

FOREIGN PATENT DOCUMENTS

CN    107333273 A  * 11/2017 ............ H04W 16/18
EP    2590443 A1    5/2013

(Continued)

OTHER PUBLICATIONS

International Search Report in PCT Application No. PCT/JP2021/043921, mailed Mar. 8, 2022, 3pp.

(Continued)

*Primary Examiner* — Yuwen Pan
*Assistant Examiner* — Swati Jain
(74) *Attorney, Agent, or Firm* — HAUPTMAN HAM, LLP

(57) ABSTRACT

A classification module classifies, based on a degree of correlation identified for each pair of base station systems, a plurality of base station systems into a plurality of base station system groups. An operation control module executes operation control of a leader base station system based on a degree of operation of the leader base station system being a prediction result. The operation control module executes operation control of a follower base station system based on the degree of operation of the leader base station system being the prediction result, and on a ratio of the degree of operation of the follower base station system with respect to the degree of operation of the leader base station system.

7 Claims, 13 Drawing Sheets

(56) References Cited

U.S. PATENT DOCUMENTS

| | | | |
|---|---|---|---|
| 2013/0343358 A1 | 12/2013 | Kato et al. | |
| 2014/0051419 A1 | 2/2014 | Brend et al. | |
| 2014/0269257 A1 | 9/2014 | Mandiganal et al. | |
| 2016/0286479 A1* | 9/2016 | Karkera | H04W 24/02 |
| 2016/0342198 A1* | 11/2016 | Hsu | G06F 1/3296 |
| 2016/0353512 A1 | 12/2016 | Lu et al. | |
| 2018/0070262 A1* | 3/2018 | Nakano | H04L 41/40 |
| 2018/0249406 A1 | 8/2018 | Tellado et al. | |
| 2019/0253930 A1* | 8/2019 | Senju | H04W 24/08 |
| 2020/0134394 A1 | 4/2020 | Teshome et al. | |
| 2022/0256363 A1 | 8/2022 | Sun et al. | |

FOREIGN PATENT DOCUMENTS

| | | | | |
|---|---|---|---|---|
| JP | 2013197704 A | * | 9/2013 | |
| JP | 2014107801 A | * | 6/2014 | |
| JP | 20165099 A | | 1/2016 | |
| JP | 2017504244 A | | 2/2017 | |
| WO | WO-2011136267 A1 | * | 11/2011 | H04W 52/0206 |
| WO | 2012001772 A1 | | 1/2012 | |

OTHER PUBLICATIONS

International Search Report in PCT Application No. PCT/JP2021/043916, mailed Feb. 22, 2022, 3pp.

* cited by examiner

FIG.7

| | 001 | 002 | 003 | 004 | 005 | 006 |
|---|---|---|---|---|---|---|
| 001 | | (0.1,50) | (0.3,-40) | (0.6,20) | (0.2,-10) | (0.9,5) |
| 002 | (0.1,-50) | | (0.5,-20) | (0.7,10) | (0.5,25) | (0.1,50) |
| 003 | (0.3,40) | (0.5,20) | | (0.8,15) | (0.5,30) | (0.7,-40) |
| 004 | (0.6,-20) | (0.7,-10) | (0.8,-15) | | (0.9,-20) | (0.1,70) |
| 005 | (0.2,10) | (0.5,-25) | (0.5,-30) | (0.9,20) | | (0.4,70) |
| 006 | (0.9,-5) | (0.1,-50) | (0.7,40) | (0.1,-70) | (0.4,-70) | |

FIG.9

| DEGREE-OF-OPERATION DATA | |
|---|---|
| TRAFFIC AMOUNT DATA | T1 |

PERFORMANCE INDEX VALUE DATA

| P-STATE DATA | AVERAGE PROCESSING TIME DATA | AVERAGE PACKET DISCARD RATE DATA |
|---|---|---|
| P1 | a1 | b1 |
| P2 | a2 | b2 |
| P3 | a3 | b3 |
| P4 | a4 | b4 |
| P5 | a5 | b5 |
| P6 | a6 | b6 |

CONTROL SYSTEM AND CONTROL METHOD

RELATED APPLICATIONS

The present application is a National Phase of International Application Number PCT/JP2021/043918, filed Nov. 30, 2021.

TECHNICAL FIELD

The present invention relates to a control system and a control method.

BACKGROUND ART

There has been known a technology of performing operation control of a base station system based on traffic prediction. As one example of such a technology, in Patent Literature 1, there is described a technology of controlling an operation state of a base station or other node apparatus based on the traffic prediction so that functions other than a function which is demanded in order to process the maximum traffic amount are stopped.

CITATION LIST

Patent Literature

[Patent Literature 1] WO 2012/001772 A1

SUMMARY OF INVENTION

Technical Problem

When the technology as described in Patent Literature 1 is used so that the operation control is performed for each of a plurality of base station systems included in a communication system, it is required to perform the traffic prediction individually in each of the base station systems, and hence a processing load of the entire communication system is increased.

The present invention has been made in view of the above-mentioned circumstances, and has an object to provide a control system and a control method which are capable of reducing a processing load of a communication system.

Solution to Problem

In order to solve the above-mentioned problem, according to one embodiment of the present invention, there is provided a control system including: degree-of-correlation identification means for identifying, based on transition data indicating a transition of a degree of operation of each of a plurality of base station systems, a degree of correlation of the transition of the degree of operation for each pair of base station systems out of the plurality of base station systems; classification means for classifying, based on the degree of correlation identified for the each pair of base station systems, the plurality of base station systems into a plurality of base station system groups; ratio identification means for identifying a ratio of the degree of operation of a follower base station system included in one of the plurality of base station system groups with respect to the degree of operation of a leader base station system included in the one of the plurality of base station system groups; prediction means for predicting the degree of operation of the leader base station system; leader operation control means for executing operation control of the leader base station system based on the degree of operation being a result of the predicting; and follower operation control means for executing operation control of the follower base station system based on the degree of operation being the result of the predicting and the ratio.

In one aspect of the present invention, the control system further includes leader determination means for determining, from among a plurality of base station systems included in the one of the plurality of base station system groups, the leader base station system based on the number of other base station systems in each of which the degree of correlation with respect to a corresponding one of the plurality of base station systems is larger than a predetermined magnitude.

Further, in one aspect of the present invention, the degree-of-correlation identification means is configured to identify, as the degree of correlation, a representative value of a cross-correlation coefficient of a value indicating the degree of operation.

In this aspect, the classification means may be configured to classify the plurality of base station systems into the plurality of base station system groups based on the representative value of the cross-correlation coefficient and a lag at a time when the cross-correlation coefficient takes a maximum value.

Further, in one aspect of the present invention, the degree of operation of each of the plurality of base station systems is a traffic amount or the number of accommodated persons in an area covered by the each of the plurality of the base station systems.

Further, in one aspect of the present invention, the leader operation control means is configured to execute power consumption control of the leader base station system, and the follower operation control means is configured to execute power consumption control of the follower base station system.

Further, according to one embodiment of the present invention, there is provided a control method including the steps of: identifying, based on transition data indicating a transition of a degree of operation of each of a plurality of base station systems, a degree of correlation of the transition of the degree of operation for each pair of base station systems out of the plurality of base station systems; classifying, based on the degree of correlation identified for the each pair of base station systems, the plurality of base station systems into a plurality of base station system groups; identifying a ratio of the degree of operation of a follower base station system included in one of the plurality of base station system groups with respect to the degree of operation of a leader base station system included in the one of the plurality of base station system groups; predicting the degree of operation of the leader base station system; executing operation control of the leader base station system based on the degree of operation being a result of the predicting; and executing operation control of the follower base station system based on the degree of operation being the result of the predicting and the ratio.

BRIEF DESCRIPTION OF DRAWINGS

FIG. 7 is a table for schematically showing an example of degree-of-correlation data.

FIG. 9 is a diagram for illustrating an example of correspondence data.

DESCRIPTION OF EMBODIMENTS

One embodiment of the present invention is now described in detail with reference to the drawings.

Figure 1:
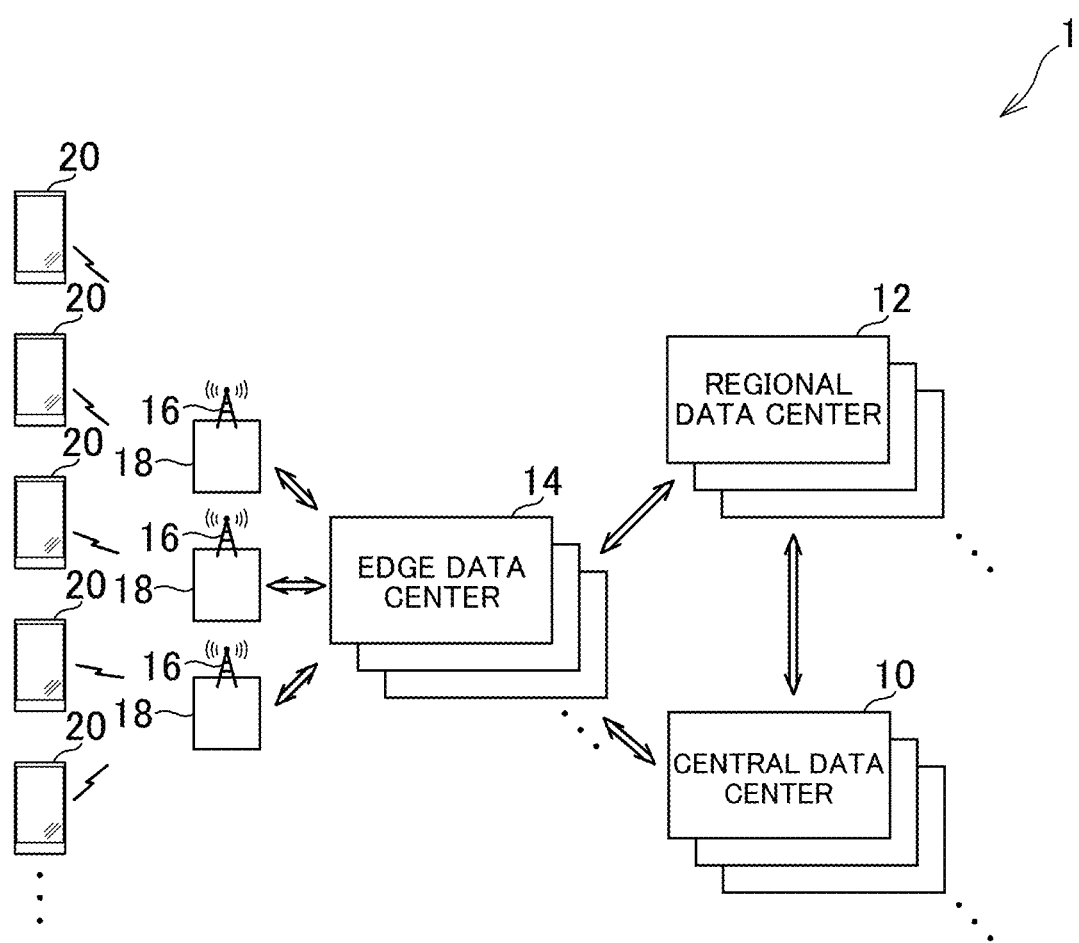
FIG. 1 is a diagram for illustrating an example of a communication system in one embodiment of the present invention.
Figure 2:
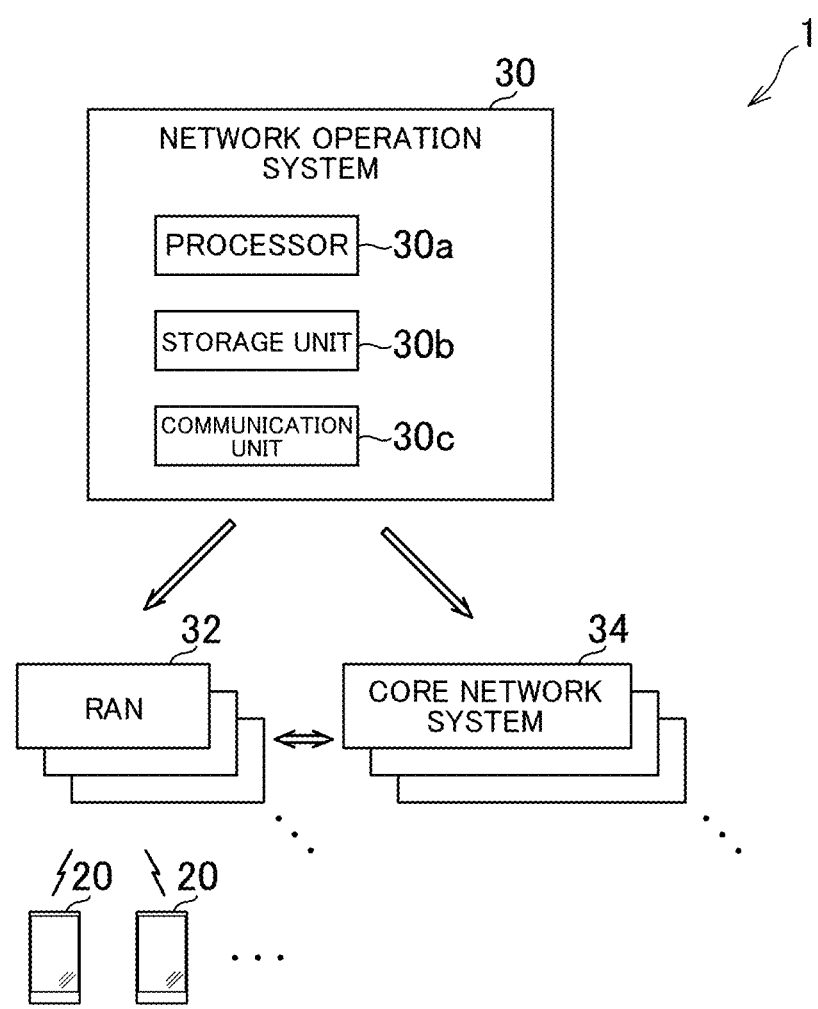
FIG. 2 is a diagram for illustrating the example of the communication system in the one embodiment of the present invention.

FIG. 1 and FIG. 2 are diagrams for illustrating an example of a communication system 1 in the one embodiment of the present invention. FIG. 1 is a diagram focusing on locations of a group of data centers included in the communication system 1. FIG. 2 is a diagram focusing on various types of computer systems implemented by the group of data centers included in the communication system 1.

As illustrated in FIG. 1, the group of data centers included in the communication system 1 is classified into central data centers 10, regional data centers 12, and edge data centers 14.

For example, several central data centers 10 are arranged in a dispersed manner in an area covered by the communication system 1 (for example, in Japan).

For example, several tens of regional data centers 12 are arranged in a dispersed manner in the area covered by the communication system 1. For example, when the area covered by the communication system 1 is the entire area of Japan, one or two regional data centers 12 may be arranged in each prefecture.

For example, several thousands of edge data centers 14 are arranged in a dispersed manner in the area covered by the communication system 1. Further, each of the edge data centers 14 can perform communication to/from a communication facility 18 including an antenna 16. In this case, as illustrated in FIG. 1, one edge data center 14 may be able to perform communication to/from several communication facilities 18. The communication facility 18 may include a computer such as a server computer. The communication facility 18 in this embodiment performs radio communication to/from a user equipment (UE) 20 via the antenna 16.

A plurality of servers are arranged in each of the central data center 10, the regional data center 12, and the edge data center 14 in this embodiment.

In this embodiment, for example, the central data center 10, the regional data center 12, and the edge data center 14 are able to perform communication to/from one another. Further, communication is also allowed between the central data centers 10, between the regional data centers 12, and between the edge data centers 14.

As illustrated in FIG. 2, the communication system 1 in this embodiment includes a network operation system (NOS) 30, a plurality of radio access networks (RANs) 32, a plurality of core network systems 34, and a plurality of UEs 20. The core network system 34, the PAN 32, and the UE 20 cooperate with each other so that a mobile communication network is achieved.

The PAN 32 is a computer system corresponding to an eNodeB (eNB) in a fourth generation mobile communication system (hereinafter referred to as "4G") or an NR base station (gNB) in a fifth generation mobile communication system (hereinafter referred to as "5G"), and is a computer system including the antenna 16. The PAN 32 in this embodiment is mainly implemented by the communication facility 18 and a group of servers arranged in the edge data center 14. A part of the RAN 32 (for example, a virtual distributed unit (vDU) and a virtual central unit (vCU) in 4G, or a distributed unit (DU) and a central unit (CU) in 5G) may be implemented by the central data center 10 or the regional data center 12 instead of the edge data center 14.

The core network system 34 is a system corresponding to an evolved packet core (EPC) in 4G or a 5G core (5GC) in 5G. The core network system 34 in this embodiment is mainly implemented by a group of servers arranged in the central data center 10 or the regional data center 12.

The NOS 30 in this embodiment is configured, for example, on a cloud platform and includes a processor 30a, a storage unit 30b, and a communication unit 30c, as illustrated in FIG. 2. The processor 30a is a program control device such as a microprocessor which operates in accordance with a program installed in the NOS 30. The storage unit 30b is, for example, a storage element such as a ROM or RAM, a solid state drive (SSD), a hard disk drive (HDD), or the like. The storage unit 30b stores a program to be executed by the processor 30a, and the like. The communication unit 30c is, for example, a communication interface such as an NIC or a wireless LAN module. Software-defined networking (SDN) may be implemented by the communication unit 30c. The communication unit 30c transmits and receives data to and from the PAN 32 and the core network system 34.

In this embodiment, the NOS 30 is implemented by a group of servers arranged in the central data center 10. The NOS 30 may be implemented by a group of servers arranged in the regional data center 12.

The communication system 1 in this embodiment provides network services such as a voice communication service and a data communication service to users who use the UE 20.

The network service provided in this embodiment is not limited to a voice communication service and a data communication service. The network service provided in this embodiment may be, for example, an IoT service.

In this embodiment, a container type application execution environment such as Docker is installed in the servers arranged in the central data center 10, the regional data center 12, and the edge data center 14, and containers can be deployed in those servers and operated. In those servers, clusters (Kubernetes clusters) managed by a container management tool such as the Kubernetes may be constructed. After that, a container-type application may be executed by a processor on the constructed cluster.

Further, the network service provided in this embodiment is implemented by a containerized network function (CNF), which is a container-based functional unit.

Figure 3:
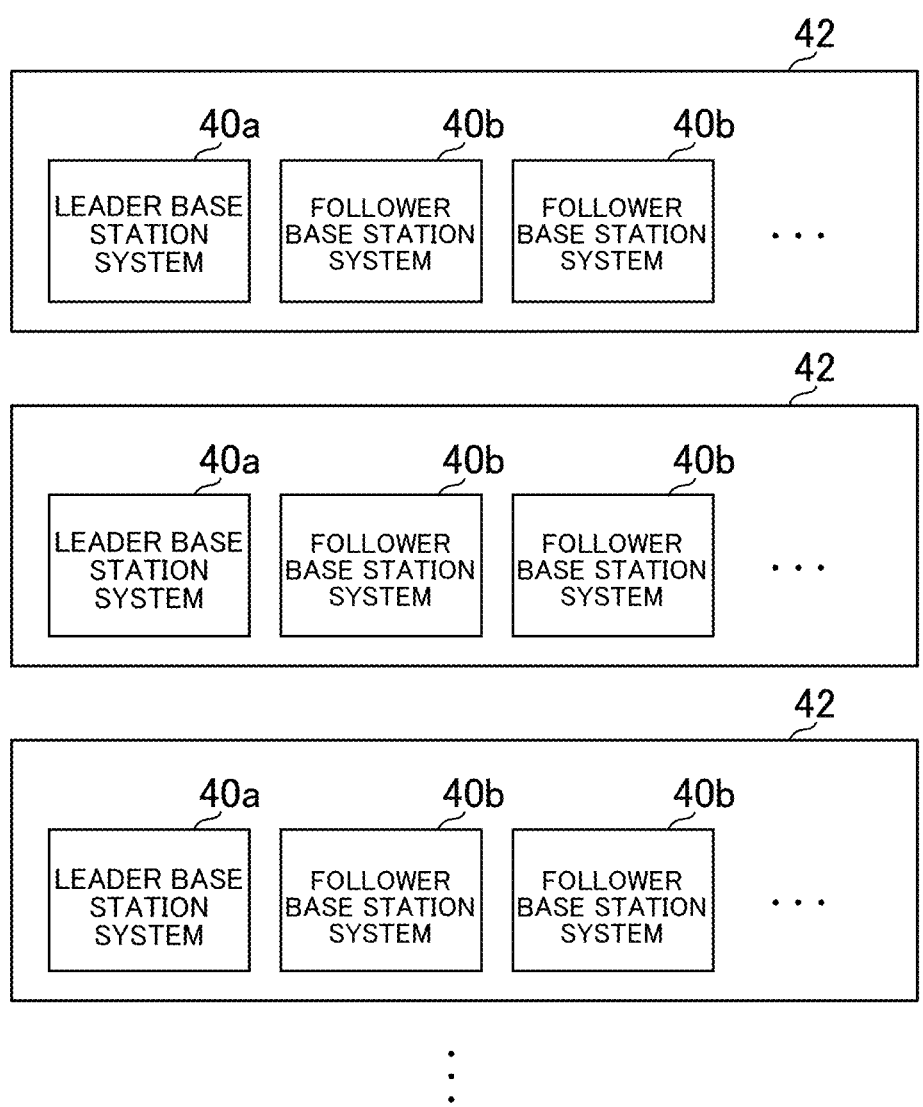
FIG. 3 is a diagram for schematically illustrating an example of classification of base station systems.

As illustrated in FIG. 3, the communication system 1 in this embodiment includes a plurality of base station systems 40.

In this case, for example, when no components of the PAN 32 are incorporated in the central data center 10 or the regional data center 12, the above-mentioned base station system 40 refers to a system corresponding to the PAN 32 constructed in one edge data center 14.

Further, in some cases, a part of the components of the PAN 32 is incorporated in the central data center 10 or the regional data center 12. For example, it is assumed that a component of the PAN 32 constructed in one edge data center 14 and a component of the PAN 32 constructed in the central data center 10 or the regional data center 12 cooperate with each other. In this case, the above-mentioned base station system 40 refers to a system corresponding to the PAN 32 including those components cooperating with each other.

In addition, as illustrated in FIG. 3, in this embodiment, for example, the plurality of base station systems 40 included in the communication system 1 are classified into a plurality of base station system groups 42.

Each of the base station system groups 42 includes a leader base station system 40a being a representative base station system 40 of this base station system group 42, and a follower base station system 40b being a base station system 40 other than the leader base station system 40a.

Further, the NOS 30 predicts, for example, at intervals of a predetermined unit period t1 (for example, 30 minutes), for the leader base station system 40a, a degree of operation (for example, a traffic amount or the number of accommodated persons) in a next unit period t1 in this leader base station system 40a. The NOS 30 may predict the degree of operation, for example, at the intervals of the predetermined unit period t1 based on the number of accommodated persons or the traffic amount in this unit period t1 and a time associated with this unit period t1 (for example, a start time or an end time of this unit period t1). In this case, the degree of operation may be predicted through use of a trained machine learning model.

In addition, in this embodiment, the operation control of all of the base station systems 40 included in the base station system group 42 is performed based on the degree of operation being the prediction result for the leader base station system 40a included in this base station system group 42.

Description is further given of functions of the NOS 30 in this embodiment and processes executed by the NOS 30 while focusing on classification of the base station systems 40 in this embodiment (grouping of the base station systems 40) and operation control of the base station systems 40.

Figure 4:
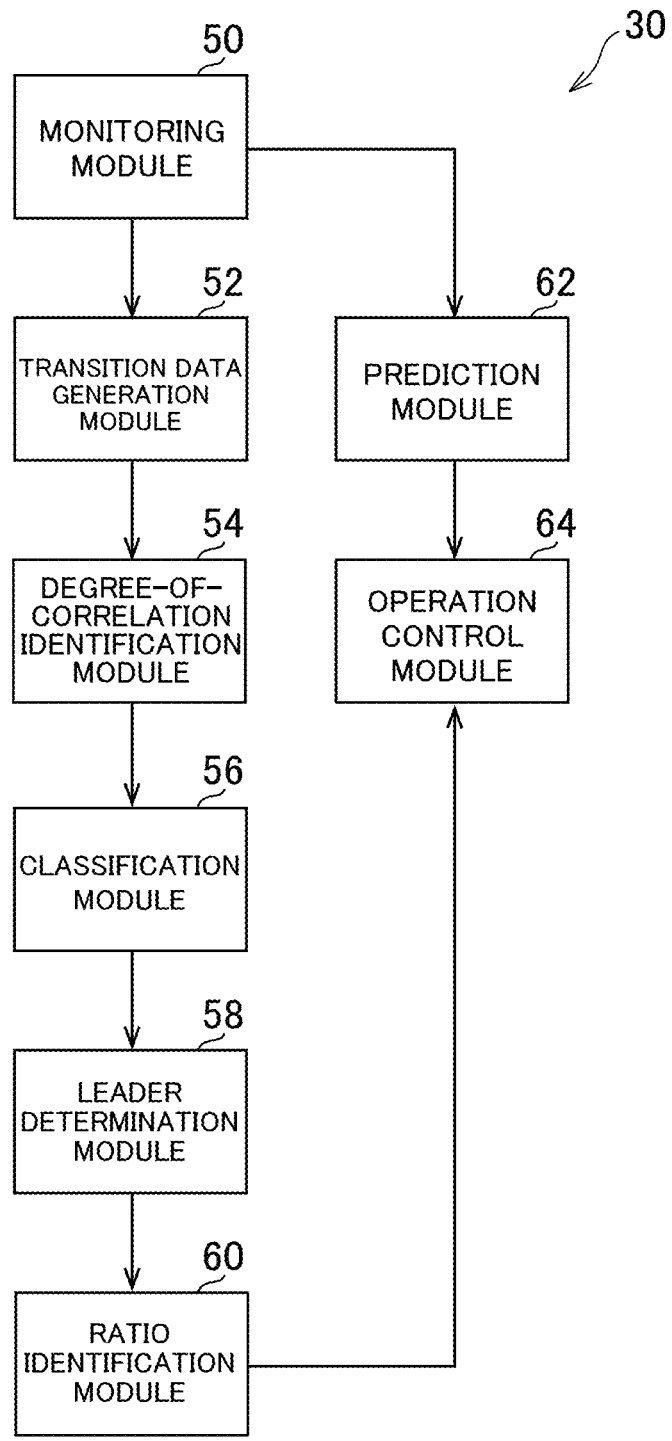
FIG. 4 is a functional block diagram for illustrating an example of functions implemented by an NOS in the one embodiment of the present invention.

FIG. 4 is a functional block diagram for illustrating an example of functions implemented by the NOS 30 in this embodiment. It is not required to implement all of the functions of FIG. 4 by the NOS 30 in this embodiment. Further, functions other than the functions of FIG. 4 may be implemented.

As illustrated in FIG. 4, the NOS 30 in this embodiment functionally includes, for example, a monitoring module 50, a transition data generation module 52, a degree-of-correlation identification module 54, a classification module 56, a leader determination module 58, a ratio identification module 60, a prediction module 62, and an operation control module 64.

The monitoring module 50 is mainly implemented by the communication unit 30c. The transition data generation module 52 is mainly implemented by the processor 30a and the storage unit 30b. The degree-of-correlation identification module 54, the classification module 56, the leader determination module 58, the ratio identification module 60, and the prediction module 62 are mainly implemented by the processor 30a. The operation control module 64 is mainly implemented by the processor 30a, the storage unit 30b, and the communication unit 30c.

The above-mentioned functions may be implemented by executing, by the NOS 30, a program that is installed in the NOS 30, which is a computer, and that includes instructions corresponding to the above-mentioned functions. Further, this program may be supplied to the NOS 30 via a computer-readable information storage medium such as an optical disc, a magnetic disk, a magnetic tape, a magneto-optical disc, or the like, or via the Internet or the like.

In this embodiment, the monitoring module 50 monitors, for example, the plurality of base station systems 40 included in the communication system 1. Then, in this monitoring, the monitoring module 50 acquires, for example, from each of the plurality of base station systems 40 included in the communication system 1, parameter data indicating values of parameters including various performance indices such as the number of accommodated persons and the traffic amount. In this embodiment, for example, the acquisition of the parameter data is repeatedly performed at predetermined time intervals.

In this case, for example, each of the base station systems 40 may successively transmit the parameter data to the NOS 30. Then, the monitoring module 50 of the NOS 30 may receive the parameter data transmitted from each base station system 40. As another example, the monitoring module 50 of the NOS 30 may successively access each of the base station systems 40, and may collect the parameter data from this base station system 40.

Figure 5:
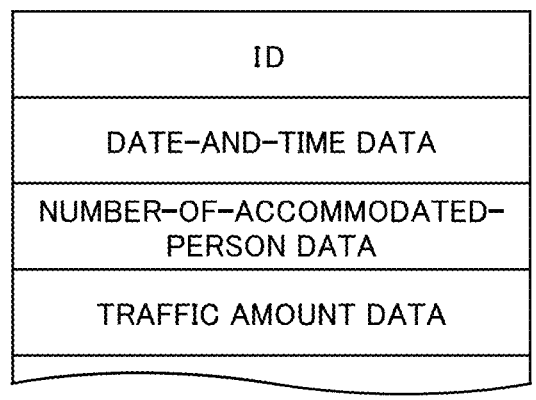
FIG. 5 is a diagram for illustrating an example of data structure of parameter data.

FIG. 5 is a diagram for illustrating an example of data structure of the parameter data acquired from the base station system 40. As illustrated in FIG. 5, the parameter data includes, for example, an ID, date-and-time data, number-of-accommodated-person data, and traffic amount data. The ID included in the parameter data is, for example, identification information on this base station system 40. The date-and-time data is, for example, data indicating date and time when for example, the number of accommodated persons and the traffic amount in this base station system 40 are identified. The number-of-accommodated-person data is, for example, data indicating the number of accommodated persons in the area covered by this base station system 40. The traffic amount data is, for example, data indicating the traffic amount in the area covered by this base station system 40.

Then, the monitoring module 50 outputs, for example, the acquired parameter data to the transition data generation module 52. In this manner, in this embodiment, for example, the parameter data is accumulated in the transition data generation module 52.

In this embodiment, the transition data generation module 52 generates, for example, based on the collected parameter data, transition data indicating a transition of the degree of operation of each of the plurality of base station systems 40 (for example, a transition of the traffic amount or a transition of the number of accommodated persons). In this case, the transition data generation module 52 may generate, for each of the IDs different from each other, the transition data of the base station system 40 associated with this ID based on the parameter data including this ID and the date-and-time data of a predetermined time range. This transition data includes, for example, traffic amount transition data being time-series data indicating the transition of the traffic amount, and number-of-accommodated-person transition data being time-series data indicating the transition of the number of accommodated persons. In this manner, a plurality of pieces of transition data each associated with the base station system 40 are generated.

In this embodiment, the degree-of-correlation identification module 54 identifies, for example, based on the transition data, a degree of correlation of the transition of the degree of operation for each pair of base station systems 40.

Figure 6:
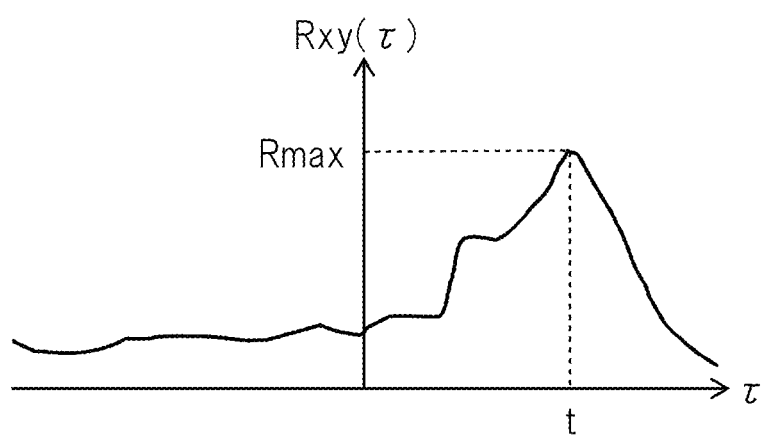
FIG. 6 is a graph for schematically showing an example of a cross-correlation coefficient.

In this case, the degree-of-correlation identification module 54 may calculate, for example, based on the transition data, a cross-correlation coefficient $Rxy(\tau)$ of a value indicating the degree of operation of the base station system 40. The degree-of-correlation identification module 54 may calculate, for example, the cross-correlation coefficient $Rxy(\tau)$ of the value of the above-mentioned traffic amount transition data. Further, the degree-of-correlation identification module 54 may calculate, for example, the cross-correlation coefficient $Rxy(\tau)$ of the value of the above-mentioned number-of-accommodated-person transition data. The cross-correlation coefficient $Rxy(\tau)$ is calculated for each of a plurality of lags FIG. 6 is a graph for schematically showing an example of the cross-correlation coefficient $Rxy(\tau)$ calculated for a certain pair of base station systems 40.

Further, the degree-of-correlation identification module 54 may identify a representative value of the cross-correlation coefficient of the value indicating the degree of operation as the degree of correlation of the transition of the degree of operation. Further, the degree-of-correlation identification module 54 may identify as well a value "t" of the lag "1" at the time when this representative value is taken.

In the following description, it is assumed that the degree-of-correlation identification module 54 identifies the maximum value Rmax of the cross-correlation coefficient and the value "t" of the lag "τ" at the time when the value of the cross-correlation coefficient is the maximum value Rmax.

Then, the degree-of-correlation identification module 54 generates degree-of-correlation data indicating a combination between the above-mentioned value Rmax and the above-mentioned value "t", which are calculated for each pair of base station systems 40. FIG. 7 is a table for schematically showing an example of the degree-of-correlation data. FIG. 7 shows, as an example, pieces of degree-of-correlation data associated with pairs of base station systems 40 for six base station systems 40 having IDs of from 001 to 006. In the example of FIG. 7, the combination of the above-mentioned value Rmax and the above-mentioned value "t" is expressed by (Rmax, t). In the example of FIG. 7, the unit of lag "τ" is, for example, "minute."

In this embodiment, the classification module 56 classifies, for example, based on the degree of correlation identified for each pair of base station systems 40, the plurality of base station systems 40 included in the communication system 1 into the plurality of base station system groups 42. In this case, the classification module 56 may classify the plurality of base station systems 40 into the plurality of base station system groups 42 based on the representative value of the cross-correlation coefficient and the lag at the time when the cross-correlation coefficient takes the maximum value.

In this embodiment, for example, initial values for a threshold value th1 of Rmax and a range of from τ1 to τ2 of the value "t" are predetermined. Then, the classification module 56 identifies, for each base station system 40, the number of pieces of degree-of-correlation data satisfying a predetermined condition from among the pieces of degree-of-correlation data relating to combinations with other base station systems 40. In this case, for example, the number of pieces of degree-of-correlation data satisfying a condition that "the value 't' is within the range of from τ1 to τ2, and the value Rmax is equal to or larger than the threshold value th1" is identified.

Then, the classification module 56 identifies the base station system 40 having the largest number of pieces of degree-of-correlation data satisfying the above-mentioned condition as a maximum-number base station system.

Then, the classification module 56 groups the maximum-number base station system identified as described above and one or a plurality of base station systems 40 satisfying the above-mentioned condition in relation to this maximum-number base station system as the base station systems 40 included in one base station system group 42.

For example, it is assumed that the threshold value th1 is 0.7, and the range of from τ1 to τ2 is from −30 to 30.

In this case, in the example of FIG. 7, in the base station system 40 having the ID of 001, a combination with the base station system 40 having the ID of 006 satisfies the above-mentioned condition.

In the base station system 40 having the ID of 002, a combination with the base station system 40 having the ID of 004 satisfies the above-mentioned condition.

In the base station system 40 having the ID of 003, a combination with the base station system 40 having the ID of 004 satisfies the above-mentioned condition.

In the base station system 40 having the ID of 004, a combination with the base station system 40 having the ID of any one of 002, 003, and 005 satisfies the above-mentioned condition.

In the base station system 40 having the ID of 005, a combination with the base station system 40 having the ID of 004 satisfies the above-mentioned condition.

In the base station system 40 having the ID of 006, a combination with the base station system 40 having the ID of 001 satisfies the above-mentioned condition.

Thus, in this case, the base station system 40 having the ID of 004 is identified as the maximum-number base station system. Then, the base station system 40 having the ID of 002, the base station system 40 having the ID of 003, the base station system 40 having the ID of 004, and the base station system 40 having the ID of 005 are grouped as the base station systems 40 included in one base station system group 42.

In the following, a process relating to the identification of the maximum-number base station system and the grouping of the base station systems 40 is referred to as "classification process."

Further, the classification module 56 executes the above-mentioned classification process for the remaining base station systems 40. For example, the classification module 56 identifies, from among the remaining base station systems 40, the base station system 40 having the largest number of pieces of degree-of-correlation data satisfying the above-mentioned condition as the maximum-number base station system. Then, the classification module 56 classifies one or a plurality of base station systems 40 satisfying the above-mentioned condition in relation to this maximum-number base station system as the base station systems 40 included in one new base station system group 42.

In this manner, the above-mentioned classification process for the base station systems 40 that have not been included in the base station system group 42 is repeatedly executed so that the grouping of the base station systems 40 is performed.

In this embodiment, in the above-mentioned classification process, there is a possibility that a base station system 40 that is not present in any of the base station system groups 42 is present. In such a case, for example, the above-mentioned threshold value th1 may be changed to a smaller value or the above-mentioned range of from τ1 to τ2 may be widened, and then the above-mentioned classification process may be executed.

In this embodiment, the leader determination module 58 determines, for example, for each base station system group 42, the leader base station system 40a from among the plurality of base station systems 40 included in this base station system group 42. In this case, the leader determination module 58 may determine the leader base station system 40a based on the number of other base station systems 40 in each of which the degree of correlation with respect to this base station system 40 is larger than a predetermined magnitude.

The leader determination module 58 may determine, for example, the base station system 40 identified as the maximum-number base station system in the above-mentioned classification process as the leader base station system 40a in the base station system group 42 including this base station system 40. Then, the leader determination module 58 may determine each of the remaining base station systems 40 as the follower base station system 40b in the base station system group 42 including this leader base station system 40a.

In the example of FIG. 7, the base station system 40 having the ID of 004 is determined as the leader base station system 40a in this base station system group 42. Then, the base station system 40 having the ID of 002, the base station system 40 having the ID of 003, and the base station system 40 having the ID of 005 are determined as the follower base station systems 40b in this base station system group 42.

In the above-mentioned classification process, instead of using the maximum value Rmax of the cross-correlation coefficient, other representative values (for example, an average value, the minimum value, or the mean square of the cross-correlation coefficient) may be used. Further, a threshold value th1 suitable for the above-mentioned representative value may be used.

Further, the leader determination module 58 is not required to determine the leader base station system 40a based on the number of other base station systems 40 in each of which the degree of correlation with respect to this base station system 40 is larger than a predetermined magnitude. For example, the leader base station system 40a may randomly be determined from among the plurality of base station systems 40 included in the base station system group 42. Further, for example, the base station system 40 geographically closest to a center among the plurality of base station systems 40 included in the base station system group 42 may be determined as the leader base station system 40a in this base station system group 42.

In this embodiment, the ratio identification module 60 identifies, for example, a ratio of the degree of operation of the follower base station system 40b included in this base station system group 42 with respect to the degree of operation of the leader base station system 40a included in the base station system group 42. In this case, when the base station system group 42 includes a plurality of follower base station systems 40b, this ratio is identified for each of the follower base station systems 40b.

For example, the ratio identification module 60 may identify a ratio of the traffic amount. For example, the ratio identification module 60 may identify a ratio of a representative value of the value of the traffic amount transition data included in the above-mentioned transition data. Further, the ratio identification module 60 may identify a ratio of the number of accommodated persons. For example, the ratio identification module 60 may identify a ratio of a representative value of the value of the number-of-accommodated-person transition data included in the above-mentioned transition data. In this case, examples of the representative value used when the ratio is identified include the maximum value, the average value, the minimum value, and the mean square.

In this embodiment, the prediction module 62 predicts, for example, the degree of operation of at least one software element included in the communication system 1. The prediction module 62 predicts, for example, for each of the plurality of base station system groups 42, the traffic amount or the number of accommodated persons in the area covered by the leader base station system 40a included in this base station system group 42.

In this case, for example, after the plurality of base station system groups 42 included in the communication system 1 are identified as described above, the monitoring module 50 may monitor only the leader base station system 40a, and acquire the parameter data only from the leader base station system 40a. Then, the prediction module 62 may predict the degree of operation of the leader base station system 40a. In this manner, a monitoring load of the communication system 1 is reduced.

Then, as described above, the prediction module 62 may predict, at intervals of the predetermined unit period t1 (for example, 30 minutes), for the leader base station system 40a, the degree of operation in the next unit period t1 in this leader base station system 40a. In this case, for example, the traffic amount may be predicted. Further, the number of accommodated persons may be predicted.

In this embodiment, the operation control module 64 executes, for example, the operation control of the leader base station system 40a based on the degree of operation of the leader base station system 40a being the prediction result obtained by the prediction module 62.

Then, in this embodiment, the operation control module 64 executes, for example, the operation control of the follower base station system 40b based on the degree of operation of the leader base station system 40a being the prediction result obtained by the prediction module 62 and on the ratio identified by the ratio identification module 60. In this case, this ratio refers to, as described above, the ratio of the degree of operation of this follower base station system 40b with respect to the degree of operation of this leader base station system 40a.

It is assumed that, for example, a traffic amount per unit period of the leader base station system 40a included in a certain base station system group 42, which is predicted by the prediction module 62, is T1. Further, it is assumed that a ratio of the degree of operation of a certain follower base station system 40b which is included in this base station system group 42 with respect to the degree of operation of this leader base station system 40*a*, which is identified by the ratio identification module 60, is "p".

In this case, the operation control module 64 executes, for this leader base station system 40*a*, operation control using T1 as an input value (manipulated variable). Then, the operation control module 64 executes, for this follower base station system 40*b*, operation control using T1×p as the input value (manipulated variable).

The operation control module 64 may transmit a control signal relating to the operation control to the base station system 40 being a target of this operation control. Then, the base station system 40 that has received this control signal may execute the operation control corresponding to this control signal.

Further, the operation control module 64 may execute, for each base station system 40, power consumption control of this base station system 40. In this case, for example, an optimal processor frequency (for example, CPU frequency) in this base station system 40 may be determined so that power saving (operation in a power saving state) suitable for the above-mentioned input value is executed. Then, the operation control module 64 may control, for each base station system 40, the CPU frequency of a CPU operating in this base station system 40 so that the determined frequency is achieved. In this case, data indicating a correspondence between the input value and the CPU frequency may be stored in the operation control module 64. Then, the operation control module 64 may execute, for the CPU included in the leader base station system 40*a*, the operation control of operating the CPU at the CPU frequency associated with the above-mentioned value T1. Further, the operation control module 64 may execute, for the CPU included in the follower base station system 40*b*, the operation control of operating the CPU at the CPU frequency associated with the above-mentioned value T1×p.

In this case, for example, data in which a range of the input value and a power state (for example, a P-state) of the processor are associated with each other in advance may be stored in the operation control module 64. Further, the operation control module 64 may control the processor included in the leader base station system 40*a* so that the processor operates in a P-state associated with the above-mentioned value T1 in this data. Further, the operation control module 64 may control the processor included in the follower base station system 40*b* so that the processor operates in a P-state associated with the above-mentioned value T1×p in this data.

Description is further given of the power consumption control of the processor executed by the operation control module 64.

Figure 8:
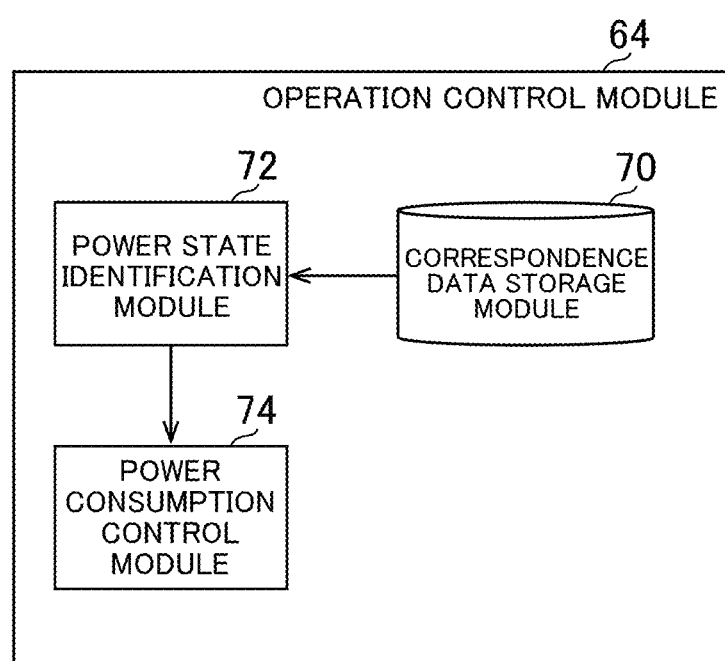
FIG. 8 is a diagram for illustrating an example of a configuration of an operation control module.

FIG. 8 is a diagram for illustrating an example of a configuration of the operation control module 64. As illustrated in FIG. 8, the operation control module 64 includes a correspondence data storage module 70, a power state identification module 72, and a power consumption control module 74. The correspondence data storage module 70 is mainly implemented by the storage unit 30*b*. The power state identification module 72 is mainly implemented by the processor 30*a*. The power consumption control module 74 is mainly implemented by the processor 30*a* and the communication unit 30*c*.

In this embodiment, the correspondence data storage module 70 stores, for example, for each of a plurality of power states into which the processor may be brought, correspondence data indicating a correspondence between a performance index value and the degree of operation relating to at least one software element included in the communication system 1. In the following description, it is assumed that this power state is a P-state.

FIG. 9 is a diagram for illustrating an example of the correspondence data. As illustrated in FIG. 9, the correspondence data includes, for example, degree-of-operation data indicating the degree of operation, and performance index value data indicating a performance index value associated with this degree of operation.

In the example of FIG. 9, the degree-of-operation data included in the correspondence data includes the traffic amount data indicating the traffic amount. Further, the performance index value data included in this correspondence data includes a plurality of combinations of P-state data, average processing time data, and average packet discard rate data. In the P-state data included in a certain combination, a P-state is indicated. In addition, in the average processing time data included in this combination, an average processing time associated with this P-state in this traffic amount is indicated. In the average packet discard rate data included in this combination, an average packet discard rate associated with this P-state in this traffic amount is indicated.

In this embodiment, for each software element such as a functional unit (NF) included in the base station system 40, for example, a DU, a CU, or the like, a load test or simulation is performed in advance in a simulated environment simulating this software element. Then, for each of the plurality of P-states, under a state in which the processor in the simulated environment is set to this P-state, a relationship between a load (traffic amount per unit period) with respect to the software element and the average processing time or the average packet discard rate is identified.

For example, the average processing time or the average packet discard rate may be measured in advance while changing the size of data input per unit period to the simulated environment. For example, the average processing time or the average packet discard rate may be measured for packets having a given data size while changing the number of packets input per unit period.

Then, the correspondence data illustrated in FIG. 9 is generated based on results of the load test or the simulation in the simulated environment as described above.

In this embodiment, the above-mentioned average processing time refers to, for example, an average value of times from when the simulated environment of the software element receives packets having a given data size to when the execution of the process in this software element is ended. Further, the above-mentioned average packet discard rate refers to, for example, a rate of the number of discarded packets with respect to the number of packets received by the simulated environment of the software element.

Further, the correspondence data may be created based on, for example, a heuristic in an actual environment instead of the results of the load test or the simulation.

In this embodiment, for example, a plurality of pieces of correspondence data associated with traffic amounts different from each other, which are associated with types of the software element, are stored in the correspondence data storage module 70. In the following, the plurality of pieces of correspondence data associated with the traffic amounts different from each other, which are associated with the types of the software element, are referred to as "correspondence data set."

In this embodiment, the power state identification module 72 identifies, for example, based on the correspondence data, any of the power states for reaching a given target relating to the performance index value in the degree of operation being the prediction result obtained by the prediction module 62. In this case, for example, the power state identification module 72 may identify a power state having the lowest power consumption among the power states for reaching the given target relating to the performance index value in the degree of operation being the prediction result obtained by the prediction module 62. In the following, the power state identified as described above is referred to as "target power state."

In this case, for example, the power state identification module 72 may calculate, based on the traffic amount T1 per unit period predicted for the leader base station system 40*a*, a traffic amount T2 per unit period per one DU included in this leader base station system 40*a*. For example, when the number of DUs included in the leader base station system 40*a* is three, a value T1/3 may be calculated as the value T2.

Then, the power state identification module 72 may identify the correspondence data including the traffic amount data having the value of T2 from among the plurality of pieces of correspondence data included in the correspondence data set associated with the DU. Then, the power state identification module 72 may identify, based on the identified correspondence data, P-states in which the value of the corresponding average processing time data is equal to or smaller than a given target value. Then, the power state identification module 72 may identify a P-state having the lowest power consumption among those P-states as a target P-state.

As another example, the power state identification module 72 may identify, based on the identified correspondence data, P-states in which a value of the corresponding average packet discard rate data is equal to or smaller than a given target value. Then, the power state identification module 72 may identify a P-state having the lowest power consumption among those P-states as a target P-state.

The power consumption becomes larger as the P-state becomes higher. For example, a state in which the P-state is P6 has the highest power consumption, and thereafter the power consumption is decreased in order of P5, P4, P3, P2, and P1.

Figure 10:
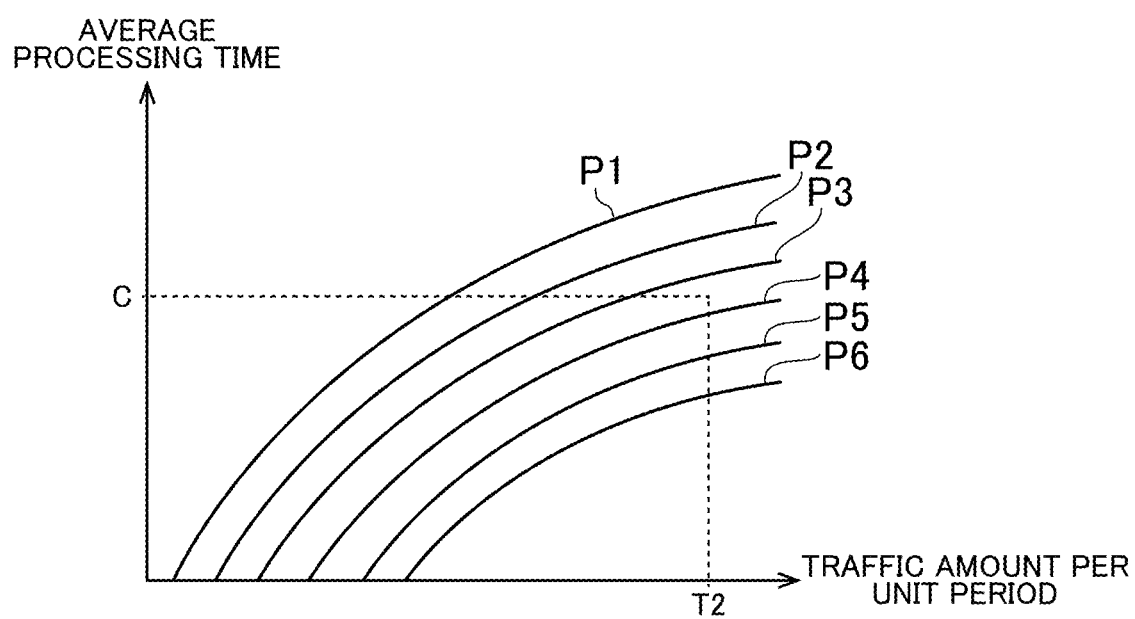
FIG. 10 is a graph for schematically showing an example of a relationship between a traffic amount per unit period and an average processing time.
Figure 11:
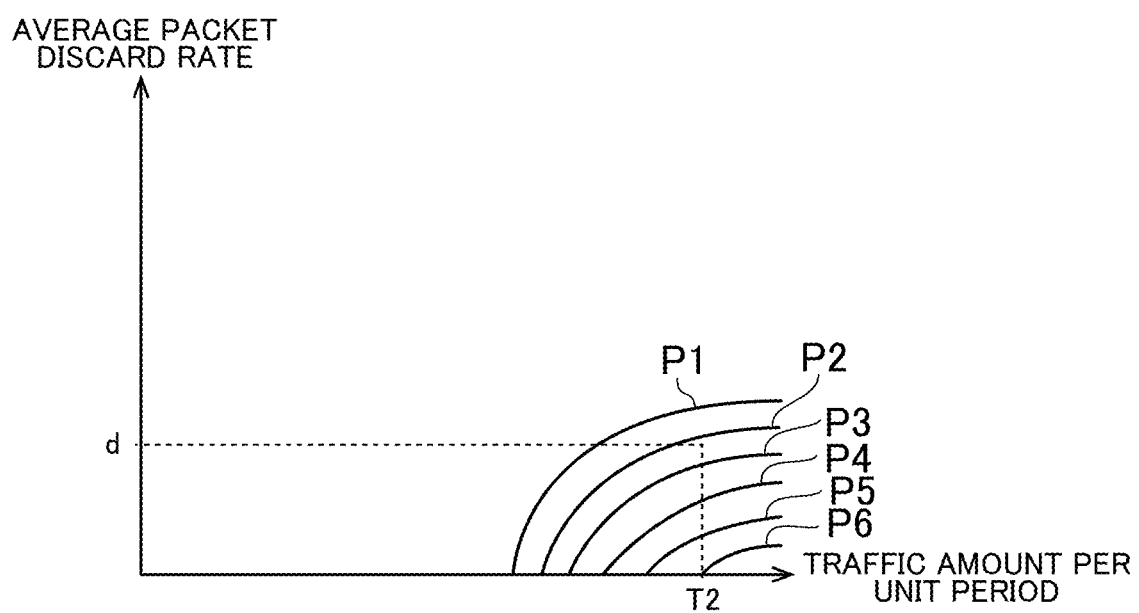
FIG. 11 is a graph for schematically showing an example of a relationship between the traffic amount per unit period and an average packet discard rate.

FIG. 10 is a graph for schematically showing an example of a relationship between the traffic amount per unit period (for example, 30 minutes) and the average processing time for each of the plurality of P-states (P1 to P6). FIG. 11 is a graph for schematically showing an example of a relationship between the traffic amount per unit period (for example, 30 minutes) and the average packet discard rate for each of the plurality of P-states (P1 to P6).

As shown in FIG. 10, when the traffic amount per unit period is fixed, the average processing time becomes shorter as the P-state becomes higher. Further, as shown in FIG. 11, when the traffic amount per unit period is fixed, the average packet discard rate becomes lower as the P-state becomes higher.

For example, it is assumed that, based on the correspondence data, as shown in FIG. 10, in the traffic amount T2 per unit period, P4 to P6 are identified as the P-states in which the value of the average processing time data is equal to or smaller than a given target value "c". In this case, from among those P-states, P4 being the P-state having the lowest power consumption may be identified as the target P-state.

Further, it is assumed that, based on the correspondence data, as shown in FIG. 11, in the traffic amount T2 per unit period, P3 to P6 are identified as the P-states in which the value of the average packet discard rate data is equal to or smaller than a given target value "d". In this case, from among those P-states, P3 being the P-state having the lowest power consumption may be identified as the target P-state.

In this embodiment, the power consumption control module 74 operates, for example, a processor for executing at least one software element in the identified power state. For example, in the above-mentioned case, the processor for executing the software element of the DU included in this leader base station system 40*a* may be operated in the target P-state identified as described above.

Further, in this embodiment, the power state identification module 72 may identify, based on the correspondence data, the power state having the lowest power consumption as a first state among the power states for reaching the given target relating to the average processing time in the degree of operation being the prediction result.

Then, the power state identification module 72 may identify, based on the correspondence data, the power state having the lowest power consumption as a second state among the power states for reaching the given target relating to the average packet discard rate in the degree of operation being the prediction result.

In the above-mentioned case, P4 corresponds to the first state, and P3 corresponds to the second state. In this case, the target relating to the average processing time cannot be reached in P3 being the second state, but both of the target relating to the average processing time and the target relating to the average packet discard rate can be reached in P4 being the first state.

In view of the above, the power consumption control module 74 may operate the processor for executing the at least one software element in one of the first state or the second state being the power state having higher power consumption. For example, in the above-mentioned case, the processor for executing the software element of the DU included in the leader base station system 40*a* may be operated in P4 being the first state. In this manner, when there are a plurality of targets, all of those targets can be reached.

When a priority is given to suppression of power consumption than reaching of the target, the power consumption control module 74 may operate the processor for executing the at least one software element in one of the first state or the second state being the power state having lower power consumption.

Further, the above-mentioned power consumption control is also applicable to the follower base station system 40*b*.

For example, the power state identification module 72 may calculate, based on the traffic amount T1 per unit period predicted for the leader base station system 40*a*, and on the above-mentioned ratio "p" relating to this follower base station system 40*b*, a traffic amount T3 per unit period per one DU. For example, when the number of DUs included in this follower base station system 40*b* is three, a value T1×p/3 may be calculated as the value T3.

Then, the processor for executing the software element of the DU included in this follower base station system 40*b* may be operated in the target P-state identified based on the value T3 as described above.

Further, the power state identification module 72 may identify, based on the correspondence data, for each P-state, a range of the traffic amount per unit period associated with this P-state. Then, the power state identification module 72 may identify a P-state associated with the range in which the traffic amount T2 per unit period is included as the target P-state.

Further, as the above-mentioned degree of operation, instead of using the traffic amount in the area covered by the at least one software element per unit period, the number of accommodated persons in the area covered by the at least one software element may be used.

Further, the above-mentioned power consumption control is also applicable to an NF (CU or the like) other than the DU. Further, the above-mentioned power consumption control is also applicable to a software element included in the core network system 34, for example, a UPF or the like, without being limited to the base station system 40.

Further, the correspondence data is not required to be associated with the type of the software element, and may be associated with the entire base station system 40. Then, the processor for executing the software element included in the base station system 40 may be operated in the power state determined based on the degree of operation predicted for this base station system 40 and the correspondence data associated with this base station system 40.

Further, the operation control in this embodiment is not limited to the power consumption control. For example, in this embodiment, control of a capacity such as the number of accommodated persons allocated to a network slice and control of a resource amount allocated to a network slice may be performed.

Further, in this embodiment, even after the plurality of base station system groups 42 included in the communication system 1 are identified, the monitoring of the follower base station system 40b may be performed.

Figure 12:
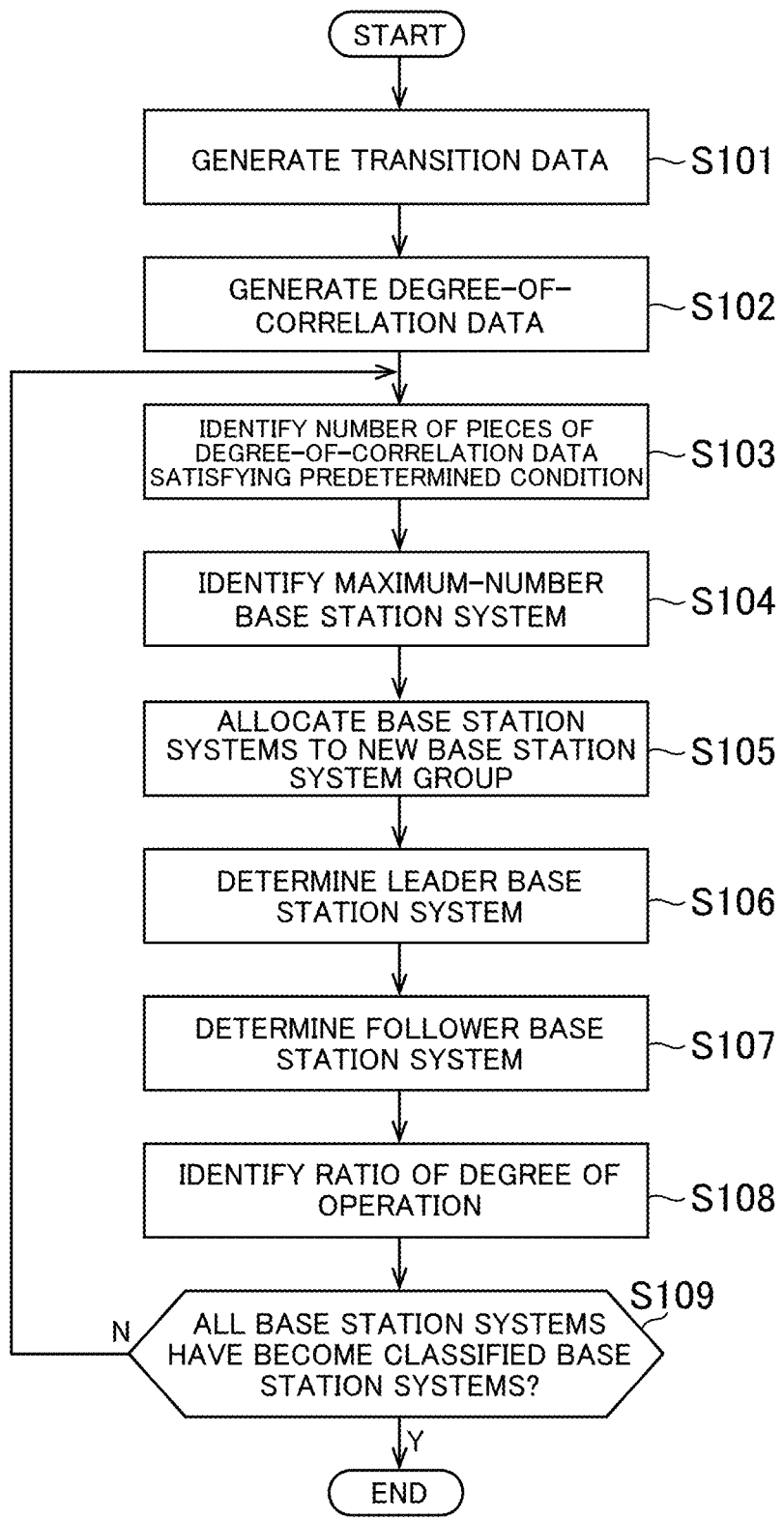
FIG. 12 is a flow chart for illustrating an example of a flow of a process executed by the NOS in the one embodiment of the present invention.

Description is now given of an example of a flow of a process relating to grouping of the base station systems 40 executed by the NOS 30 in this embodiment, with reference to the flow chart exemplified in FIG. 12.

In this process example, it is assumed that, with the monitoring performed by the monitoring module 50, the parameter data is acquired for the plurality of base station systems 40 included in the communication system 1, and the parameter data is accumulated in the transition data generation module 52.

Further, in this process example, the base station system 40 classified into any of the base station system groups 42 is referred to as "classified base station system," and the base station system 40 not classified into any of the base station system groups 42 is referred to as "unclassified base station system." In the initial state, all of the base station systems 40 are unclassified base station systems.

First, the transition data generation module 52 generates transition data for a predetermined time range, for each of the plurality of unclassified base station systems (Step S101).

Then, the degree-of-correlation identification module 54 generates, based on the transition data generated in the process step of Step S101, for each pair of base station systems 40, degree-of-correlation data associated with this pair (Step S102).

Then, the classification module 56 identifies, for each of the plurality of unclassified base station systems, the number of pieces of degree-of-correlation data satisfying the above-mentioned predetermined condition among the pieces of degree-of-correlation data relating to combinations with other unclassified base station systems (Step S103).

Then, the classification module 56 identifies the unclassified base station system having the largest number identified in the process step of Step S103 as the maximum-number base station system (Step S104).

Then, the classification module 56 allocates, to a new base station system group 42, the maximum-number base station system identified in the process step of Step S104 and one or a plurality of unclassified base station systems satisfying the above-mentioned predetermined condition in relation to this maximum-number base station system (Step S105). The unclassified base station systems allocated to the new base station system group 42 as described above become classified base station systems.

Then, the leader determination module 58 determines the maximum-number base station system identified in the process step of Step S104 as the leader base station system 40a in the base station system group 42 to which the unclassified base station systems have been allocated in the process step of Step S105 (Step S106).

Then, the leader determination module 58 determines the remaining base station systems 40 allocated to the base station system group 42 in the process step of Step S105 as the follower base station systems 40b in this base station system group 42 (Step S107).

Then, the ratio identification module 60 identifies, for each of the follower base station systems 40b determined in the process step of Step S107, the ratio "p" of the degree of operation of this follower base station system 40b with respect to the degree of operation of the leader base station system 40a determined in the process step of Step S106 (Step S108).

Then, the classification module 56 confirms whether or not all of the base station systems 40 have become the classified base station systems (Step S109).

When all of the base station systems 40 have not become the classified base station systems (Step S109: N), the process returns to the process step of Step S103. At this time, the process step of Step S103 may be executed after the predetermined condition in the process step of Step S103 is changed.

When it is confirmed that all of the base station systems 40 have become the classified base station systems in the process step of Step S109 (Step S109: Y), the process illustrated in this process example is ended.

Figure 13:
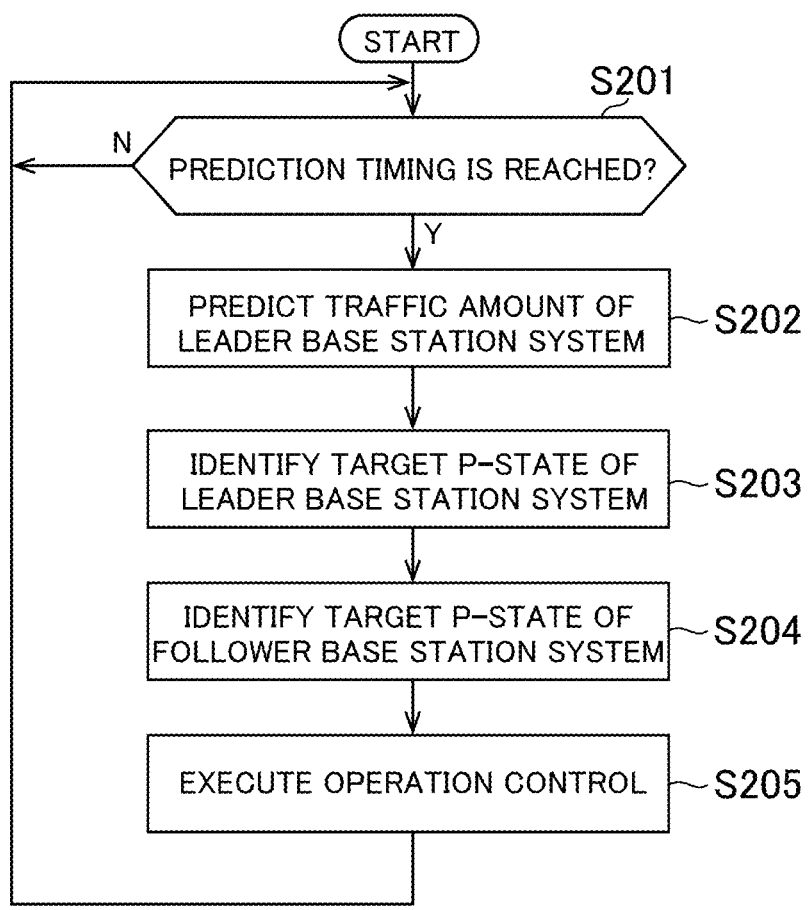
FIG. 13 is a flow chart for illustrating an example of a flow of a process executed by the NOS in the one embodiment of the present invention.

Next, description is given of an example of a flow of a process relating to the operation control of the base station system 40 executed by the NOS 30 in this embodiment, with reference to the flow chart exemplified in FIG. 13. In this process example, it is assumed that the correspondence data is stored in advance in the correspondence data storage module 70.

For example, the process steps of from Step S201 to Step S205 are independently executed for each of the plurality of base station system groups 42.

First, the prediction module 62 waits until a prediction timing that occurs at the intervals of the predetermined unit period t1 is reached (Step S201).

When the prediction timing is reached, the prediction module 62 predicts, based on the parameter data of the leader base station system 40a of this base station system group 42, which has been acquired in the latest unit period t1, the traffic amount T1 of this leader base station system 40a in the next unit period t1 (Step S202).

Then, the power state identification module 72 identifies the target P-state of this leader base station system 40a (Step S203). In the process step of Step S203, for example, the target P-state of this leader base station system 40a is identified based on the traffic amount T1 identified in the process step of Step S202.

Then, the power state identification module 72 identifies the target P-state for each of the one or the plurality of follower base station systems 40b included in this base station system group 42 (Step S204). In the process step of Step S204, for example, for each of the one or the plurality of follower base station systems 40b, the target P-state of this follower base station system 40b is identified based on the traffic amount T1 identified in the process step of Step S202 and the ratio "p" identified in the process step of Step S108 for this follower base station system 40b.

Then, the power consumption control module 74 executes the operation control for each of the base station systems 40 included in this base station system group 42 (Step S205), and the process returns to the process step of Step S201. In the process step of Step S205, for example, the leader base station system 40a is controlled so that the CPU of the server included in this leader base station system 40a is operated in the target P-state identified in the process step of Step S203. Further, the follower base station system 40b is controlled so that the CPU of the server included in this follower base station system 40b is operated in the target P-state identified for this follower base station system 40b in the process step of Step S204.

In this embodiment, only the leader base station system 40a included in the base station system group 42 is a prediction target of the degree of operation, and the degree of operation is not predicted for the follower base station system 40b. In this manner, according to this embodiment, the processing load of the communication system 1 can be reduced.

Further, in this embodiment, the power consumption control is performed by controlling the power state such as the P-state. Thus, according to this embodiment, while the communication performance is ensured, power consumption control having high readiness with respect to the change in degree of operation can be performed.

It should be noted that the present invention is not limited to the above-mentioned embodiment.

The invention claimed is:

1. A control system, comprising:
    at least one processor; and
    at least one memory device storing instructions which, when executed by the at least processor, cause the at least one processor to perform operations comprising:
    identifying, based on transition data indicating a transition of a degree of operation of each of a plurality of base station systems, a degree of correlation of the transition of the degree of operation for each pair of base station systems out of the plurality of base station systems;
    classifying, based on the degree of correlation identified for the each pair of base station systems, the plurality of base station systems into a plurality of base station system groups;
    identifying a ratio of the degree of operation of a follower base station system included in one of the plurality of base station system groups with respect to the degree of operation of a leader base station system included in the one of the plurality of base station system groups;
    predicting the degree of operation of the leader base station system;
    operation control of the leader base station system based on the degree of operation being a result of the predicting; and
    executing operation control of the follower base station system based on the degree of operation being the result of the predicting and the ratio.

2. The control system according to claim 1, wherein the operations further comprise determining, from among a plurality of base station systems included in the one of the plurality of base station system groups, the leader base station system based on the number of other base station systems in each of which the degree of correlation with respect to a corresponding one of the plurality of base station systems is larger than a predetermined magnitude.

3. The control system according to claim 1, wherein identifying the degree of correlation comprises identifying, as the degree of correlation, a representative value of a cross-correlation coefficient of a value indicating the degree of operation.

4. The control system according to claim 3, wherein classifying comprises classifying the plurality of base station systems into the plurality of base station system groups based on the representative value of the cross-correlation coefficient and a lag at a time when the cross-correlation coefficient takes a maximum value.

5. The control system according to claim 1, wherein the degree of operation of each of the plurality of base station systems is a traffic amount or the number of accommodated persons in an area covered by the each of the plurality of base station systems.

6. The control system according to claim 1,
    wherein executing operation control of the leader base station system comprises executing power consumption control of the leader base station system, and
    wherein executing operation control of the follower base station system comprises executing power consumption control of the follower base station system.

7. A control method, comprising:
    identifying, based on transition data indicating a transition of a degree of operation of each of a plurality of base station systems, a degree of correlation of the transition of the degree of operation for each pair of base station systems out of the plurality of base station systems;
    classifying, based on the degree of correlation identified for the each pair of base station systems, the plurality of base station systems into a plurality of base station system groups;
    identifying a ratio of the degree of operation of a follower base station system included in one of the plurality of base station system groups with respect to the degree of operation of a leader base station system included in the one of the plurality of base station system groups;
    predicting the degree of operation of the leader base station system;
    executing operation control of the leader base station system based on the degree of operation being a result of the predicting; and
    executing operation control of the follower base station system based on the degree of operation being the result of the predicting and the ratio.

* * * * *